United States Patent
Kasner et al.

Patent Number: 5,407,760
Date of Patent: Apr. 18, 1995

[54] SEALING PLUG FOR A LEAD BATTERY

[75] Inventors: Günter Kasner; Jürgen Krichbaum, both of Hagen; Bernd Lüger, Lünen; Hans-Walter Pichlo, Hagen, all of Germany

[73] Assignee: Varta Batterie Aktiengesellschaft, Hanover, Germany

[21] Appl. No.: 285,396

[22] Filed: Aug. 3, 1994

[30] Foreign Application Priority Data

Aug. 14, 1993 [DE] Germany ............ 9312173 U

[51] Int. Cl.6 .................................... H01M 2/12
[52] U.S. Cl. .................................... 429/54; 429/89
[58] Field of Search ............ 429/54, 55, 72, 82, 429/86, 89, 185

[56] References Cited

U.S. PATENT DOCUMENTS

| | | | |
|---|---|---|---|
| 2,571,893 | 10/1951 | Kendall | 429/54 |
| 3,398,026 | 8/1968 | Andre | 429/54 |
| 3,436,273 | 4/1969 | Gratzmuller | 429/54 |
| 4,078,121 | 3/1978 | Gratzmuller | 429/54 |
| 4,584,248 | 4/1986 | Jwata | 429/54 |
| 4,788,112 | 11/1988 | Kung | 429/54 |

FOREIGN PATENT DOCUMENTS

| | | |
|---|---|---|
| 2208858 | 9/1973 | Germany. |
| 2402718 | 11/1974 | Germany. |
| 9104291 | 8/1991 | Germany. |

*Primary Examiner*—Anthony Skapars
*Attorney, Agent, or Firm*—Weiser & Associates

[57] ABSTRACT

A sealing plug for a lead battery which prevents both the emergence of acid mist from the cell, and its harmful effects on the operation of the safety valve of the sealing plug, is configured to cause escaping cell gases to follow a path to the outside of the cell which first passes through a porous frit and which then proceeds through a pressure-release valve. To this end, a housing base is provided which includes a bottom portion for receiving the frit and for engaging a filler opening of the battery's lid. A premounted pressure-release valve including a compression spring and a sealing disk is retained between the housing base and a cap for engaging an outer flange of the housing base, for enclosing the resulting structure.

10 Claims, 1 Drawing Sheet

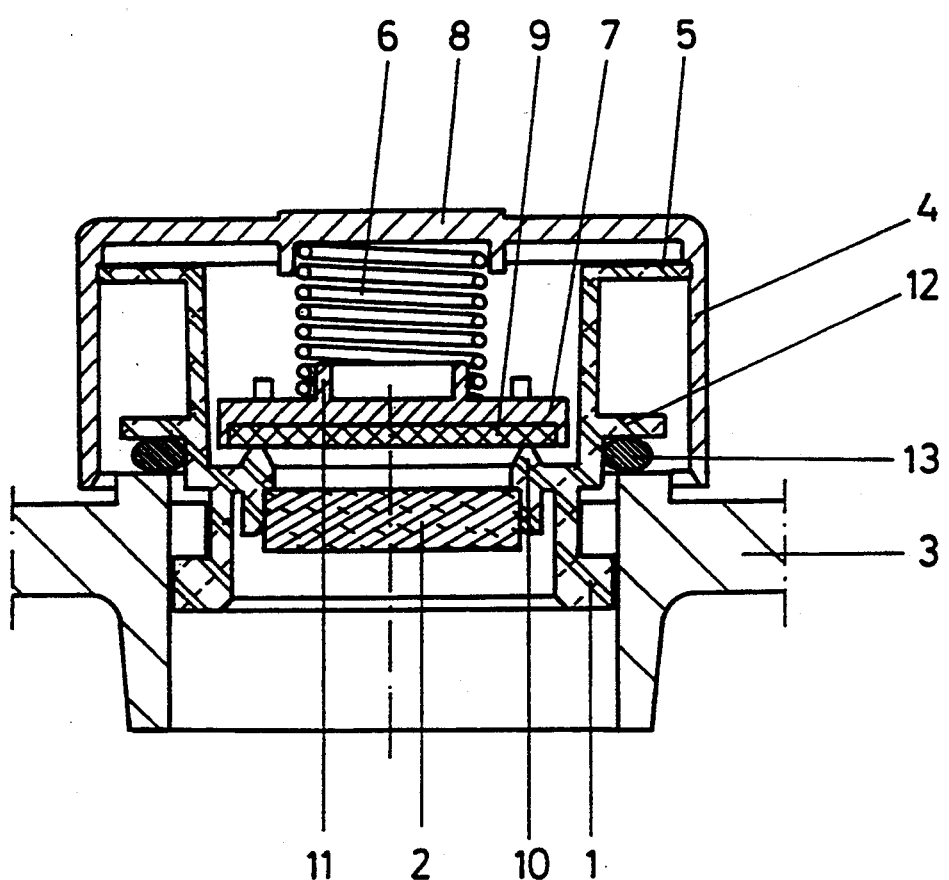

SEALING PLUG FOR A LEAD BATTERY

BACKGROUND OF THE INVENTION

The present invention relates generally to sealing plugs for lead batteries, and more particularly, to a sealing plug including a microporous frit and a pressure-release valve in a housing for enclosing the electrolyte filling openings of the battery's cell lid.

Under certain operating conditions, such as during recharging, sealing plugs are used to ensure the safe escape of gases from the battery. In such cases, the sealing plug functions as a ventilating seal. Frequently, the sealing plug includes safety devices which operate both individually and in combination with one another to prevent damage resulting from the uncontrolled release of cell gases.

Various devices have been proposed in an effort to ensure safe battery operation. For example, pressure-releasing valves of various designs have been used which open only upon reaching an impermissibly high internal pressure. Porous frits of glass or ceramic have been used to enclose the gas ventilating opening and shield the explosive oxyhydrogen gas mixture in the interior of the battery from ignition by exposure to external sparks (so-called "flashback"), forming a spark-over ignition barrier. Catalysts have been used for recombination of the cell gases, and anti-splash baskets or devices for separating acid drops from the gas stream have been proposed.

For example, DE-OS 22 08 858 discloses a simple sealing plug equipped with a pressed-on, disk-shaped blocking member formed of a gas-permeable, but essentially liquid impermeable material. DE-PS 24 02 718 discloses a sealing plug having a porous barrier preceded by horizontal plates with openings which force the cell gases into a winding (serpentine) flow path. German Utility Model G 91 04 291 discloses the combination of a pressure-release valve and a frit body in a sealing plug.

A gas containing an acid mist can escape not only from lead batteries with liquid electrolytes, but also from those with gelled electrolytes. This is caused by "syneresis", a spontaneous contraction occurring predominantly in the head space of the cell with the precipitation of liquid from the acid gel during aging. This effect intensifies, especially in the case of horizontally constructed cells, so that upon the opening of the pressure-release valve, an acid mist passes to the exterior.

A disadvantage of the foregoing is that the discharged acid mist then tends to precipitate as drops on the cell lid. This is objectionable for maintenance personnel, and the acid mists which are produced can cause the overall function of the plug to be impaired.

SUMMARY OF THE INVENTION

It is therefore the primary object of the present invention to prevent the escape of aerosols from the cells of a battery while simultaneously ensuring that the function of the pressure-release valve is preserved over its useful service life.

These and other objects which will become apparent are achieved in accordance with the present invention by a sealing plug for a lead battery which includes a microporous frit and a pressure-release valve in a housing for enclosing an electrolyte filling opening of the battery's cell cover, wherein the microporous frit is positioned ahead of the pressure-release valve in the direction of gas release. As a result, escaping gases are first passed through the microporous frit, and then the pressure-release valve, as the released gases are forced through the plug housing to the exterior of the system.

In this way, small acid drops in the aerosol are captured in the porous frit. The operative parts of the valve are in turn exposed to a dry gas stream. Especially in the case of sensitive metal parts, such as compression springs and the like, the result is that no corrosion damage will occur. The valve is reliably protected against aggressive moisture by the frit body (which is mounted in the direction of gas flow), allowing the valve to reliably operate for a long time.

BRIEF DESCRIPTION OF THE DRAWING

For further detail regarding the sealing plug of the present invention, reference is made to the description which is provided below, together with a single FIGURE showing a sectional view of the described sealing plug.

DETAILED DESCRIPTION OF A PREFERRED EMBODIMENT

The illustrated sealing plug includes a housing base or socket 1 having a bottom portion for receiving a microporous frit 2 and for engaging (e.g., a bayonet seal) a cell opening of a battery lid 3. The connection with the lid can also be implemented as a threaded closure, instead of a bayonet seal, if desired. The lowermost position of the frit 2 within the cell opening is important, and should be no higher than the plane defined by the battery lid 3.

The frit is formed of an acid-unwettable or water-unwettable material, preferably a synthetic resin such as polypropylene or polyethylene. The porosity of the frit 2 is selected so that any produced aerosols are effectively retained, but so that the frit 2 is not fouled or plugged by precipitated drops of moisture.

A cap 4 is firmly connected to the housing base 1, for enclosing the resulting structure. The cap 4 may be glued, or preferably snapped onto an outer flange 5 surrounding the housing base 1.

The space enclosed by the cap 4 and the housing body 1, above the frit 2, receives the elements of a pressure-release valve including a compression spring 6 and a sealing disk 7. In the embodiment illustrated, the compression spring 6 is supported by a concentric holder 8 depending from the major face of the cap 4. The bottom of the sealing disk 7 includes a sealing support 9 which, under the pressure of the compression spring 6, rests on a circular sealing flange 10 formed on the housing base 1.

During assembly, and before the cap 4 is applied to the housing base 1, the components of the pressure-release valve are in turn mounted on the housing body 1. The sealing disk 7 is first layed on the sealing flange 10 of the housing base 1. The compression spring 6 is next positioned on the sealing disk 7. To facilitate this, the compression spring 6 is centered by a cross-piece 11 which is annularly positioned on the top side of the sealing disk 7. Following this, the cap 4 is fitted over the housing base 1, receiving and retaining the spring 6 between the spring holder 8 and the cross-piece 11. These several components are sized to ensure a precise amount of clearance for the sealing disk 7, between its closed and open positions.

Another flanged projection 12 surrounds the outside of the housing body 1 and faces an O-ring 13, which is advantageously preassembled before the cap 4 is fitted to the housing base 1. Upon closure of the sealing plug (either a bayonet seal or a threaded connection), the flanged projection 12 exerts the necessary sealing forces to the O-ring 13 and against the battery lid 3. Gas releasing openings (not shown) are provided in the cap 4 (preferably adjacent to the spring holder 8 for receiving the compression spring 6, in the major face of the cap 4) for releasing gas to the atmosphere.

Resulting from its design, the sealing plug of the present invention operates to prevent moisture from escaping the cell, so that the corrosion-susceptible safety valve is protected against aggressive moisture, while effectively venting overpressures occurring in the cell.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A sealing plug for enclosing an electrolyte filling opening formed in a lid of a lead battery, comprising a microporous frit and a pressure-release valve contained in a housing, wherein the housing includes means for engaging the electrolyte filling opening and means for communicating with a head space enclosed by the lid of the lead battery, and wherein the microporous frit is positioned between the communicating means and the pressure-release valve.

2. The sealing plug of claim 1 wherein the housing includes a housing base for receiving the microporous frit, and a cap for enclosing the housing base.

3. The sealing plug of claim 2 wherein the pressure-release valve is received between the housing base and the cap, and includes a compression spring and a sealing disk.

4. The sealing plug of claim 3 wherein the sealing disk has a bottom including a seal for engaging a circular sealing flange formed on the housing base.

5. The sealing plug of claim 3 wherein the compression spring and the sealing disk of the pressure-release valve include means for being mounted on the housing base, prior to receiving the cap.

6. The sealing plug of claim 5 wherein the sealing disk has a top including an annular member for receiving a first end of the compression spring.

7. The sealing plug of claim 6 wherein the cap includes a central holder depending from a major face of the cap, for receiving a second end of the compression spring.

8. The sealing plug of claim 2 wherein the cap is detachably connected to the housing base by a snap-fitting.

9. The sealing plug of claim 1 wherein the engaging means is a bayonet fitting.

10. The sealing plug of claim 1 wherein the engaging means is a threaded fitting.

* * * * *